United States Patent
Ombe Wandji et al.

(10) Patent No.: US 10,040,970 B2
(45) Date of Patent: Aug. 7, 2018

(54) GLASS STRAND STRUCTURE DESIGNED TO REINFORCE BONDED ABRASIVE ARTICLES

(75) Inventors: Nadege Ombe Wandji, Maisons Alfort (FR); Alix Arnaud, Montrouge (FR); Philippe Espiard, Gouvieux (FR); Katarzyna Chuda, Asnieres sur Seine (FR)

(73) Assignee: SAINT-GOBAIN ADFORS, Courbevoie (FR)

( * ) Notice: Subject to any disclaimer, the term of this patent is extended or adjusted under 35 U.S.C. 154(b) by 1311 days.

(21) Appl. No.: 13/642,653

(22) PCT Filed: Apr. 21, 2011

(86) PCT No.: PCT/FR2011/050921
§ 371 (c)(1),
(2), (4) Date: Dec. 28, 2012

(87) PCT Pub. No.: WO2011/131913
PCT Pub. Date: Oct. 27, 2011

(65) Prior Publication Data
US 2013/0111822 A1    May 9, 2013

(30) Foreign Application Priority Data

Apr. 21, 2010  (FR) ...................... 10 53039

(51) Int. Cl.
*D02G 3/00* (2006.01)
*C09D 161/06* (2006.01)
(Continued)

(52) U.S. Cl.
CPC ............ *C09D 161/06* (2013.01); *C03C 25/24* (2013.01); *C08J 5/24* (2013.01); *C08L 61/00* (2013.01);
(Continued)

(58) Field of Classification Search
CPC ......... C03C 25/00; C03C 25/10; C03C 25/24; C03C 25/26; C03C 25/34; C03C 25/42; C09D 161/00; C09D 161/04; C09D 161/16; C08L 61/00; C08L 61/04; C08L 61/06; C08L 61/12; C08L 61/14; C08L 2201/50; C08L 2201/52; C08L 2201/54; C08L 2201/56; C08L 2666/02; C08L 2666/16; C08L 2666/68; C08L 2205/02; C08K 5/0091; C08K 5/34922; C08K 5/3492; C08K 5/3477; C08K 5/34; C08J 5/24; C08J 2361/00; C08J 2361/04; C08J 2361/06; C08J 2361/08; C08J 2361/12; D03D 15/0011; B24D 3/00; B24D 3/02; B24D 3/28; B24D 3/285; B24D 3/344; Y10T 428/2964

See application file for complete search history.

(56) References Cited

U.S. PATENT DOCUMENTS

| | | | | | |
|---|---|---|---|---|---|
| 2,398,361 | A | * | 4/1946 | Daniels | 525/505 |
| 2,965,514 | A | * | 12/1960 | Less et al. | 427/221 |
| RE25,661 | E | * | 10/1964 | Less et al. | 427/221 |
| 3,635,877 | A | * | 1/1972 | Wyk | 523/145 |
| 4,918,116 | A | * | 4/1990 | Gardziella | B24D 3/285 260/998.13 |
| 5,254,639 | A | * | 10/1993 | Gardziella | C04B 35/634 106/218 |
| 5,304,225 | A | * | 4/1994 | Gardziella | C04B 35/532 51/298 |
| 5,368,934 | A | * | 11/1994 | Torii | C08J 5/04 428/367 |

(Continued)

FOREIGN PATENT DOCUMENTS

| | | |
|---|---|---|
| FR | 2 917 403 | 12/2008 |
| FR | 2 921 666 | 4/2009 |
| GB | 1151174 | 5/1969 |
| WO | WO 2009004250 A2 * | 1/2009 |
| WO | WO 2009053580 A2 * | 4/2009 |

OTHER PUBLICATIONS

Lin-Giboson, et al., "Controlled molecular weight cresol-formaldehyde oligomers"; Polymer 43 (2002), pp. 2017-2029.*
CYMEL 303 Data sheet, 2000.*
Ratna, Debdatta. (2009). Handbook of Thermoset Resins. Smithers Rapra Technology.*
International Search Report dated Aug. 3, 2011 in Application No. PCT/FR2011/050921.

*Primary Examiner* — Peter Y Choi
*Assistant Examiner* — Jennifer A Gillett
(74) *Attorney, Agent, or Firm* — Oblon, McClelland, Maier & Neustadt, L.L.P.

(57) ABSTRACT

A structure based on glass strand coated with a resin composition containing, by weight percent of solid matter: from 75 to 98% of a mixture of a first novolac having a glass transition temperature lower than or equal to 60° C. and a second novolac having a glass transition temperature above 60° C.; from 0.5 to 10% of a wax; from 1 to 15% selected from an imine and a modified melamine of formula (I):

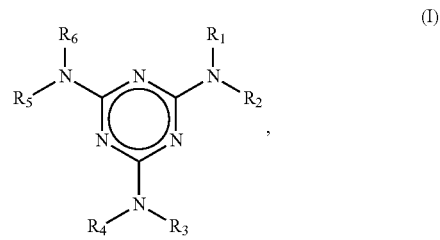

where $R_1$, $R_2$, $R_3$, $R_4$, $R_5$, and $R_6$ are each independently —H, —CH$_2$OH, —CH$_2$OCH$_3$, or —CH$_2$OCH$_2$OCH$_3$ radical, with at least one of $R_1$ to $R_6$ not being H; and from 0 to 10% of a plasticizing agent. Also, a resin composition for producing a reinforcing structure and bonded abrasive articles incorporating such a structure.

17 Claims, No Drawings

(51) Int. Cl.
*C03C 25/24* (2018.01)
*C08J 5/24* (2006.01)
*C08L 61/00* (2006.01)
*C08L 61/06* (2006.01)
*C08K 5/3492* (2006.01)

(52) U.S. Cl.
CPC .......... *C08L 61/06* (2013.01); *C08J 2361/06* (2013.01); *C08K 5/34922* (2013.01); *Y10T 428/2964* (2015.01)

(56) References Cited

U.S. PATENT DOCUMENTS

| | | | |
|---|---|---|---|
| 5,371,169 A * | 12/1994 | Lu | C08L 61/04 525/480 |
| 5,611,827 A * | 3/1997 | Hammarstrom et al. | 51/298 |
| 5,658,360 A * | 8/1997 | Keil | 51/298 |
| 5,686,506 A * | 11/1997 | Gerber | C04B 35/03 523/139 |
| 5,827,337 A * | 10/1998 | Keil | 51/298 |
| 5,910,521 A * | 6/1999 | Johnson et al. | 523/145 |
| 5,976,204 A * | 11/1999 | Hammarstrom et al. | 51/298 |
| 6,514,302 B2 * | 2/2003 | Lemberger et al. | 51/298 |
| 8,523,967 B2 * | 9/2013 | Arnaud et al. | 51/298 |
| 8,545,584 B2 * | 10/2013 | Arnaud et al. | 51/298 |
| 2004/0043684 A1 * | 3/2004 | Dern | B24D 3/28 442/59 |
| 2005/0009980 A1 * | 1/2005 | Swedo | C08G 8/10 524/494 |
| 2007/0272781 A1 * | 11/2007 | Tsuda | C08K 3/22 242/155 R |
| 2009/0227723 A1 * | 9/2009 | Kaya et al. | 524/495 |
| 2010/0180512 A1 * | 7/2010 | Arnaud et al. | 51/298 |
| 2010/0203282 A1 * | 8/2010 | Keipert | B24D 5/08 428/99 |
| 2010/0298505 A1 * | 11/2010 | Arnaud et al. | 525/475 |
| 2013/0111822 A1 * | 5/2013 | Ombe Wandji et al. | 51/298 |
| 2013/0338288 A1 * | 12/2013 | Arnaud et al. | 524/389 |

* cited by examiner

GLASS STRAND STRUCTURE DESIGNED TO REINFORCE BONDED ABRASIVE ARTICLES

The present invention relates to the field of abrasives. It relates more precisely to a structure based on glass strand coated with a resin composition designed to reinforce bonded abrasive articles, in particular grinding wheels, the resin composition used for coating this structure and the bonded abrasive articles incorporating such a structure.

Abrasive articles contain a multitude of abrasive particles solidly bound together by a binder. These articles are widely employed for machining parts made of various materials, particularly in cut-off, deburring, surface grinding and polishing operations.

In a conventional manner, the following may be distinguished:
coated abrasives that comprise a flexible backing on the surface of which abrasive particles are distributed fixed in a binder. The flexible backing may be a sheet of paper or a network of fibers, for example, a mat, a felt or a fabric. These articles may adopt various forms, sheets, disks, belts, cones, etc.
bonded abrasives that are obtained from a mixture of abrasive particles and a binder, formed and compacted by molding under pressure. They consist essentially of abrasive grinding wheels.

Bonded abrasive articles to which the invention more particularly relates are abrasive grinding wheels for cutting of hard materials, in particular steel. These grinding wheels are employed on machines operating at a high peripheral speed, and on account of this must be able to withstand high mechanical stresses produced by the latter.

In particular, it is important for the following requirements to be satisfied:
the abrasive particles must be suited to the nature of the material to be processed: they must be sufficiently durable so as not to crumble in contact with said material, and to preserve sharp edges so that they can cut it;
the binder must have good tensile strength so that the abrasive particles remain bonded to it and are not torn out under the effect of centrifugal force. In addition the binder should be able to withstand high temperatures that result from high friction with the material to be processed; the binder must neither flow nor be degraded under the effect of heat,
the abrasive grinding wheel should not wear prematurely nor break; it must retain its initial dimensional properties for as long as possible so that cutting is carried out under good conditions.

It is usual to consolidate the abrasive grinding wheel by incorporating therein at least one structure based on reinforcing strands, such as glass strands that may be for example in the form of a fabric.

However, given that bare glass strands have virtually no adhesion to the binder, it is necessary to coat the glass strand structure with a resin composition that ensures a bond between the glass and the binder.

In a known manner, the reinforcing structure is obtained by passing the glass strands through a bath with a resin composition consisting of an alcoholic solution containing of the order of 70% by weight of resin, and then passing them between two rollers so as to remove the excess resin, and finally in a chamber heated to a temperature of the order of 100 to 145° C. for a maximum of a few minutes so as to reduce the quantity of solvent based on the resin to a value of approximately 5% to 10%. The reinforcing structure obtained in this way is collected in the form of a winding, for example a reel, or is cut up either into sheets or directly into the desired shape and dimensions of the final grinding wheel, for example by means of a punch.

In a subsequent step, the abrasive grinding wheel is obtained according to the method that consists of placing in a mold, alternately, several layers of the mixture of abrasive particles and binder on the one hand, and of the reinforcing structure on the other hand, and of molding the assembly by compression either hot or cold. After demolding, the article obtained is treated thermally under temperature conditions enabling the binder to be crosslinked and finally to obtain the abrasive grinding wheel.

The resin compositions most commonly used for the production of the aforementioned reinforcement structures comprise at least one thermosetting resin chosen from:
urea-aldehyde resins, for example a urea-formaldehyde resin (GB-A-419 812),
phenolic resins, for example one or more novolacs (GB-A-1 151 174 and WO-A-2009/004250) or a resol in solution associated with a solid novolac (U.S. Pat. No. 4,338,357), and
mixtures of urea-aldehyde resins and phenolic resins, for example a urea-formaldehyde prepolymer and a phenolic resin in the A stage (U.S. Pat. No. 4,038,046) or a urea-formaldehyde resin and a resol in the presence of an acid catalyst (U.S. Pat. No. 5,551,961).

The aforementioned resin compositions enable reinforcing structures to be obtained that exhibit good properties, particularly in terms of flexibility and adhesive power.

It is in point of fact important that the structure has a sufficient high flexibility, that is to say the resin is not too "hard" so that the cutting operations as previously described can be carried out under acceptable conditions, by generating the least possible dust and by operating so that the resin is not removed in the vicinity of the cut edges of the structure (glass is not laid bare).

However, it is also necessary for the structure to have an adhesive power (also called "tack") that is not too high, so that the resin does not soil the cutting tools and that, during storage, the structures do not stick together and the dust does not adhere to said structures. In this way, one avoids having to place an antiblocking material on the structure before it is reeled up or between cut structures.

The structure must also have acceptable mechanical properties, especially a high enough tensile strength so that the final abrasive article, in particular the grinding wheel, does not break under standard operating conditions.

Finally, as regards regulations, it is necessary to ensure that the resin compositions are non-polluting, that is to say that they contain—but also that they generate during application to the reinforcement structure or subsequently, in particular while the final grinding wheel is used—the fewest possible compounds that can harm human health or the environment.

The object of the present invention is to provide a glass strand structure which can be used to reinforce bonded abrasive articles, and in particular grinding wheels, that offers a good compromise between the various abovementioned properties.

The reinforcing structure in accordance with the invention is coated with a resin composition comprising the following constituents in the proportions indicated, expressed as a percentage by weight of solid matter:

75 to 98% of a mixture of at least one novolac having a glass transition temperature lower than or equal to 60° C. and at least one novolac having a glass transition temperature above 60° C., 0.5 to 10% of at least one wax, 1 to 15% of at least one crosslinking agent chosen from imines and modified melamines of formula:

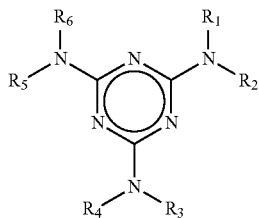

in which $R_1$, $R_2$, $R_3$, $R_4$, $R_5$ and $R_6$, which are identical or different, represent a hydrogen atom or a $-CH_2OH$, $-CH_2OCH_3$ or $-CH_2OCH_2OCH_3$ radical, at least one of the radicals $R_1$ to $R_6$ being other than H, 0 to 10% of at least one plasticizing agent.

The novolac having the lower glass transition temperature gives flexibility to the structure and makes it possible to have a high level of flexibility. It makes it possible to compensate for the too high rigidity of the novolac with a higher glass transition temperature and in this way to adjust the flexibility to the desired level.

As already mentioned, it is important to have high flexibilities so that the structure can be correctly cut, in particular without the resin composition being able to "crumble away" in the region of the edges, leaving the glass bare.

Preferably, the novolac having the lower glass transition temperature, that is to say below or equal to 60° C., represents 10 to 50% by weight of the mixture of novolacs.

Advantageously, the glass transition temperature of the novolac with the lower glass transition temperature is above 20° C. Similarly, the glass transition temperature of the novolac having the higher glass transition temperature is above or equal to 80° C., and advantageously lower than or equal to 100° C.

Novolacs according to the invention may be chosen from novolacs known to a person skilled in the art obtained by reacting a phenolic compound, preferably phenol, and an aldehyde, preferably formaldehyde, in the presence of an acid catalyst (pH of the order of 4 to 7). Preferably, the formaldehyde/phenol molar ratio varies from 0.75 to 0.85. The choice of novolac is made according to the desired glass transition temperature.

Novolacs that may be used within the context of the invention contain less than 0.1% by weight of free formaldehyde, and preferably less than 0.05%.

Wax acts as an "antiblocking" agent and makes it possible to compensate for the high adhesive power of the novolac that has the lower glass transition temperature. As already said, an adhesive power that is not too high makes it possible, on the one hand, to preserve cut reinforcing structures in a very valuable state of cleanliness that avoids contamination by dust, and on the other hand makes it possible to handle these cut structures with a minimum risk of their adhering to each other under moderate pressure, notably during storage.

The wax is chosen from paraffin waxes, for example polyethylene or polypropylene waxes, and ethylenebisamide waxes, notably N,N'-ethylenebis(steramide). Advantageously, the wax is microcrystalline.

Preferably, the wax content does not exceed 3% by weight of solid matter of the resin composition, and advantageously is less than or equal to 2%.

The crosslinking agent improves the mechanical properties of the strands forming the structure, in particular by increasing their tensile strength. As indicated previously, the crosslinking agent is chosen from imines, in particular hexamethylenetetramine and modified melamines corresponding to the aforementioned formula, in which preferably at least one of the radicals $R_1$ to $R_6$ is equal to $-CH_2OCH_3$ and advantageously 4 to 6 of these radicals are equal to $-CH_2OCH_3$. Particularly preferably, the modified melamine is hexamethoxymethylmelamine. Modified melamines are preferred because they are able to react with novolacs without releasing formaldehyde.

The amount of crosslinking agent preferably represents 3 to 9%, and advantageously 7 to 8%, by weight of solid matter of the resin composition.

The plasticizing agent contributes to an improvement to the flexibility of the resin composition. As examples of such agents, mention may be made of alkylphosphates, phthalates, triethanolamine, oils and polyhydric alcohols, notably glycerol and glycols.

Preferably, the plasticizing agent content does not exceed 3% by weight of solid matter of the resin composition.

Because the resin composition coating the reinforcing structure according to the invention is relatively stable over time, it is possible to maintain the reinforcing structure for a long period of time, especially up to 90 days without significant loss of properties.

The reinforcing structure may be composed of continuous glass strands, preferably in the form of a nonwoven such as a web or a mat, a mesh or fabric, or of a mat of cut strands.

The glass strands are strands called "reinforcing", produced industrially from molten glass threads flowing from the multiple orifices of a die, these threads being drawn out mechanically in the form of continuous filaments that are assembled into a base strand and then collected by reeling on a rotating support.

The glass strands according to the invention are thus base strands, and products derived from these strands, in particular assemblies of these base strands in laminates. Such assemblies are obtained by simultaneously unreeling several coils of base strands and then assembling them into meshes that are reeled onto a rotating support. The glass strands may undergo a twisting operation in order to produce textile strands for producing fabrics.

The glass strands consist of glass filaments of which the diameter may vary widely, for example from 9 to 24 μm, preferably 9 to 17 μm. Advantageously, the glass strands have a count (or linear mass) of between 34 and 4800 tex, preferably between 34 and 1200 tex.

The strands may consist of any type of glass, in particular E, C and AR (alkali-resistant). Preferably, they consist of E glass.

According to a preferred embodiment, the structure is a fabric composed of glass strands, having a grammage that varies from 100 to 1000 g/m².

The resins composition itself, before it is applied to the reinforcing structure, also constitutes an object of the invention. Thus, the resin composition comprises the following compounds, expressed in percentage by weight:

25 to 55% of at least one novolac having a glass transition temperature above or equal to 60° C., 10 to 30% of at least one novolac having a glass transition temperature lower than 60° C., 0.5 to 6.5% of at least one wax, 0.5 to 9% of at least one crosslinking agent chosen from imines, in particular hexamethylenetetramine and modified melamines corresponding to the aforementioned formula, in particular hexamethoxymethylmelamine, 0 to 3% of at least one plasticizing agent, 25 to 45% of at least one alcohol, 0 to 15% of water.

As an alcohol according to the invention, mention may be made of methanol, ethanol, isopropanol and mixtures of these alcohols.

The resin composition may be prepared by simply mixing the constituents in a suitable vessel, advantageously provided with stirring means. The novolacs are preferably in the form of a solution in ethanol or a mixture of ethanol and methanol, the wax is a dispersion in water, the crosslinking agent is in solution in water and the plasticizing agent is liquid.

As the case may be, the resin composition may contain additives such as emulsifiers, pigments, fillers, antimigration agents, coalescing agents, wetting agents, biocides, organosilanes, antifoam agents, colorants and anti-oxidant agents. The additives content does not exceed 3% of solid matter of the resin composition.

Production of the coated reinforcing structure is carried out continuously by passing it first of all through an impregnating bath consisting of the liquid resin composition, and then through the nip of a calendering device composed of two rollers, which makes it possible to adjust the resin composition content to a value close to 30% by weight of solid matter, and finally through a heated chamber so as to remove part of the solvent. Preferably, the chamber comprises a first zone heated to a temperature of the order of 130° C. and at least one second zone heated to a temperature of the order of 110° C., the dwell time of the reinforcing structure in both zones being generally less than ten minutes, preferably varying from 30 seconds to 3 minutes. Preferably, the percentage solvent in the reinforcing structure is less than 12% and advantageously less than 13%. The reinforcing structure obtained is then collected in the form of a reel and cut up either into sheets or directly in the shape and dimensions of the final abrasive grinding wheel, these cut structures being then stored in the form of stacks.

The reinforcing structure according to the invention may be used in particular for producing articles in the form of bonded abrasives such as abrasive grinding wheels, these articles thus constituting an object of the invention.

These abrasive articles may be produced in particular according to compression molding techniques known to a person skilled in the art. For example, the abrasive grinding wheels may be obtained by depositing several alternate layers of a granular mixture of abrasive particles inside a mold, and the reinforcing structure previously cut up to the dimensions of the mold. The number of reinforcing structures varies according to the desired level of the performance for the abrasive grinding wheel; generally, this number does not exceed 10.

The mold is put under pressure sufficient to form a "green" part that exhibits cohesion so that it may be handled and processed in the following steps without substantial modification to the shape and dimensions. The mold may be heated during compression (hot molding) to a temperature that is generally below 170° C. or even 150° C. The binder at this stage is in the non-crosslinked state.

The green part is removed from the mold and heated in an oven at a temperature enabling the binder to crosslink and to give a hardened polymer network that gives the part its final form. Crosslinking is carried out according to a conventional curing cycle that consists of bringing the green part to a temperature of the order of 100° C. and of holding it at this temperature for a duration ranging from 30 minutes to several hours so that the volatile products formed may be removed. The part is then heated to a temperature of the order of 200 to 250° C. for 10 to 35 hours.

The abrasive grinding wheel obtained in this way may be used in all types of application that require abrasive properties, for example sanding, deburring, surface finishing operations, and more particularly the cutting of hard materials, such as steel.

The examples given hereinafter enable the invention to be illustrated without however limiting it.

In these examples, the properties of the reinforcing structure were evaluated under the following conditions:

flexibility: a sample of reinforcing structure (4 mm×12 mm) was placed in a stiffness tester which measured the flexural strength (in mN) at various bending angles. The flexural strength is acceptable when its value is at most equal to 250 mN.

adhesive power: four reinforcing structures in the form of 10 to 12 cm diameter disks were superimposed and a temperature of 500 N was applied for one minute. The adhesive power was measured by evaluating the ability of the structures to be able to be separated manually from one another by an operator, according to a scale of values ranging from 1 to 5: 1=no bonding; 3=average bonding, easy separation; 5=strong bonding, separation impossible.

the tensile strength of the warp or weft strand was measured under the conditions of ISO standard 3341 applicable to glass strands up to 2000 tex. The value of the textile strength is expressed in N/5 cm.

amount of dust: a sample of the reinforcing structure (8 cm×8 cm) was weighed and folded manually three times so as to have a total fold length of 45±1 cm. The sample was unfolded and weighed. The percentage of loss in weight of sample corresponded to the amount of dust. The amount of dust is a parameter that makes it possible to evaluate the ability to be cut: it is considered as being acceptable when its value is less than 2%.

the loss on ignition, in %, was measured under the conditions of ISO standard 1887.

EXAMPLES 1 TO 7

Resin compositions were prepared comprising the constituents listed in Table 1.

Each resin composition was used to impregnate a fabric composed of glass strands ((leno weave; warp strand EC 204 tex s/z; weft strand RO 408 tex; No. COUNTS (10 cm): weft 23±5%, warp 24±5% (×2)) which was then dried at 140° C. for 1 minute in an oven.

The properties of the glass fabric are listed in Table 1.

EXAMPLE 8

This example illustrates the application of the resin composition in an industrial installation.

A glass strand fabric described in Examples 1 to 7, 0.5 m wide, unwound from a reel, was disposed on an industrial coating line operating continuously. On its path, the fabric passed into an impregnating bath containing the resin composition of Example 1 and was then treated in an oven comprising a first section heated to 135° C., and a second section heated to 115° C., before being collected in the form of a reel.

The glass strand fabric had the following properties:
Amount of dust: 0.8%
Tensile strength: warp: 3100 N/5 cm; weft: 3500 N/5 cm
Adhesive power after 30 days: 1.5
Loss on ignition: 30%

TABLE 1

| Example | 1 | 2 | 3 | 4 | 5 | 6 (comparative) | 7 (comparative) |
|---|---|---|---|---|---|---|---|
| Phenol-formaldehyde novolac[1] (Tg around 80° C.) | 41.40 (64.4) | 42.55 (65.5) | 41.40 (62.2) | 41.40 (60.3) | 41.40 (60.3) | 44.60 (67.4) | 52.00 (78.8) |
| Phenol-formaldehyde novolac[2] (Tg around 40° C.) | 19.10 (29.7) | 19.65 (30.2) | 19.10 (28.7) | 19.10 (27.8) | 19.10 (27.9) | 20.60 (31.1) | 14.00 (21.2) |
| Polyethylene wax[3] | 0.90 (1.4) | 0.90 (1.4) | 0.90 (1.3) | 0.90 (1.3) | 0.90 (1.3) | 1.00 (1.5) | — |
| Hexamethylenetetramine[4] | 2.90 (4.5) | 1.90 (2.9) | — | — | — | — | — |
| Hexamethoxymethylmelamine[5] | — | — | 5.25 (7.8) | — | — | — | — |
| Hexamethoxymethylmelamine[6] | — | — | — | 7.25 (10.6) | — | — | — |
| Hexamethoxymethylmelamine[7] | — | — | — | — | 7.20 (10.5) | — | — |
| Water | 5.25 | 3.70 | 2.90 | 0.90 | 0.90 | 1.00 | — |
| Alcohol | 30.45 | 31.30 | 30.45 | 30.45 | 30.45 | 32.80 | 34.00 |
| Flexibility (mN) | 160 | 130 | 155 | 160 | 170 | 110 | n.d. |
| Adhesive power | | | | | | | |
| T = 0 | 2.5 | 2.0 | 2.0 | 2.0 | 2.5 | 2.5 | 4.0 |
| T = 15 days | 2.0 | 2.2 | 1.5 | 1.5 | 2.5 | 2.0 | 3.5 |
| T = 30 days | 1.5 | 1.5 | 1.5 | 1.5 | 2.5 | 1.5 | 3.5 |
| Tensile strength (N/5 cm) | 3400 | 3000 | 3400 | 3200 | 2800 | 2200 | 2300 |

Between parentheses: % by weight of solid matter
n.d.: not determined
[1]sold under the reference "Prefere ® 3E 5057E X-C 69" by DYNEA; solution having a concentration of 65% by weight of solid matter in ethanol
[2]sold under the reference "PF7505 IL ®" by HEXION; solution having a concentration of 70% by weight of solid matter in ethanol
[3]sold under the reference "Hydrocer 69" by SHAMROCK; solution having a concentration of 50% by weight of solid matter in ethanol
[4]sold under the reference "Hexamine" by HEXION; solution having a concentration of 40% by weight of solid matter in water
[5]sold under the reference "Cyrez ® 963L" by CYTEC; 100% of hexamethoxymethylmelamine; solution having a concentration of 72% of solid matter in water
[6]sold under the reference "Cohedur ® A" by CYTEC; 50% of hexamethoxymethylmelamine and 50% of mineral fillers; content of solid matter: 100%
[7]sold under the reference "Resamin ® HF480" by CYTEC; 100% of hexamethoxymethylmelamine; content of solid matter: 100%

The invention claimed is:

1. A glass strand structure comprising continuous glass strands in the form of a web, a mat, a mesh, or a fabric, or cut glass strands in the form of a mat,
    wherein the web, mat, mesh, or fabric comprises a coating comprising a resin composition, wherein the resin composition comprises, by weight percent of solid matter of the resin composition:
    from 75 to 98% of a mixture comprising a first novolac having a glass transition temperature lower than or equal to 60° C. and a second novolac having a glass transition temperature above 60° C.;
    from 0.5 to 10% of a wax;
    from 1 to 15% of at least one crosslinking agent selected from the group consisting of an imine and modified melamine of formula (I):

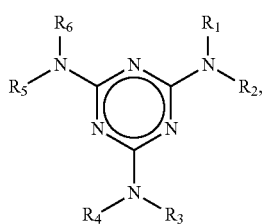

(I)

wherein $R_1$, $R_2$, $R_3$, $R_4$, $R_5$, and $R_6$ are each independently a hydrogen atom, or a —$CH_2OH$, —$CH_2OCH_3$, or —$CH_2OCH_2OCH_3$ radical, where at least one of the radicals $R_1$ to $R_6$ is not H; and
    from 0 to 10% of a plasticizing agent,
    wherein the first and second novolacs are obtained by reacting phenol and formaldehyde in a formaldehyde/phenol molar ratio in a range from 0.75 to 0.85.

2. The structure of claim 1, wherein the first novolac is 10 to 50% by weight of the mixture of novolacs.

3. The structure of claim 1, wherein the first novolac has a glass transition temperature greater than 20° C.

4. The structure of claim 1, wherein the second novolac has a glass transition temperature above or equal to 80° C.

5. The structure of claim 1, wherein the wax is a paraffin wax or an ethylenebisamide wax.

6. The structure claim 1, wherein the wax content does not exceed 3% by weight of solid matter of the resin composition.

7. The structure of claim 1, wherein at least one of the radicals $R_1$ to $R_6$ is equal to —$CH_2OCH_3$.

8. The structure of claim 1, wherein the crosslinking agent is selected from the group consisting of hexamethylenetetramine and hexamethoxymethylmelamine.

9. The structure of claim 1, wherein the content of crosslinking agent is 3 to 9%, by weight of solid matter of the resin composition.

10. The structure of claim 1, wherein the plasticizing agent is an alkylphosphate, a phthalate, triethanolamine, an oil, a polyhydric alcohol, or any mixture thereof.

11. The structure of claim 1, wherein the plasticizing agent content does not exceed 3% by weight of solid matter of the resin composition.

12. The structure of claim 1, comprising the continuous glass strands in the form of a web, a mat, a mesh, or a fabric.

13. The structure of claim 12, wherein the continuous glass strands have a diameter varying from 9 to 24 μm.

14. The structure of claim 12, wherein the continuous glass strands have a count (or linear mass) of between 34 and 4800 tex.

15. The structure of claim 1, comprising the continuous glass strands in the form of a fabric having a grammage varying from 100 to 1000 g/m².

16. A bonded abrasive article, comprising:
   abrasive particles bonded with a binder; and
   the glass structure of claim 1.

17. The article of claim 16, in the form of an abrasive grinding wheel.

\* \* \* \* \*